No. 821,038. PATENTED MAY 22, 1906.
J. J. HERVEY.
SECTIONAL CAM.
APPLICATION FILED APR. 9, 1904.
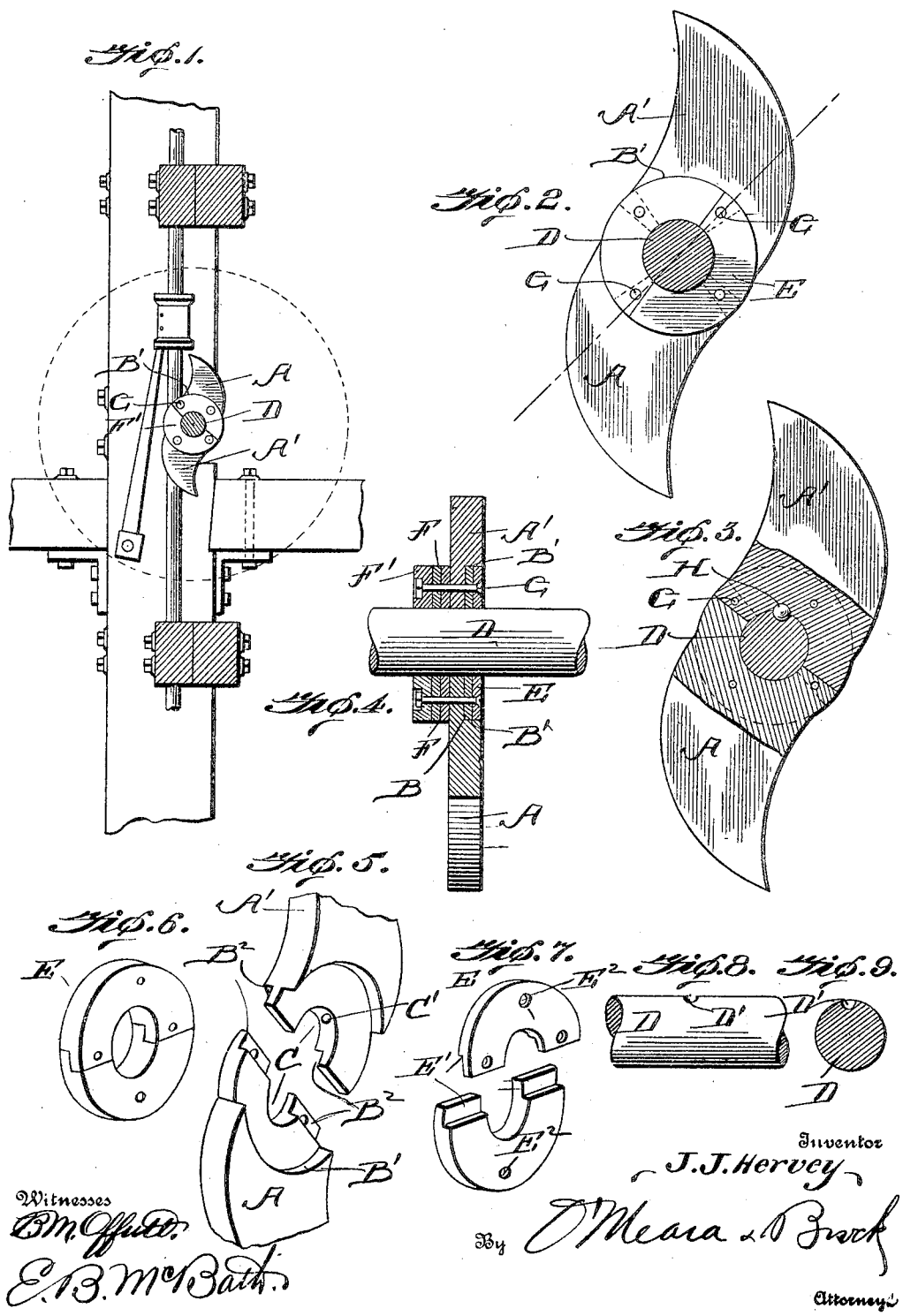

UNITED STATES PATENT OFFICE.

JAMES J. HERVEY, OF RANDSBURG, CALIFORNIA.

SECTIONAL CAM.

No. 821,038.     Specification of Letters Patent.     Patented May 22, 1906.

Application filed April 9, 1904. Serial No. 202,396.

*To all whom it may concern:*

Be it known that I, JAMES J. HERVEY, a citizen of the United States, residing at Randsburg, in the county of Kern and State of California, have invented a new and useful Improvement in Sectional Cams, of which the following is a specification.

This invention relates to a cam formed in sections in order that it may be the more readily applied to or removed from the cam-shaft; and a further object of the invention is an improvement in the manner of keying the cam to the shaft.

My invention consists in the novel features of construction and combination of parts hereinafter described, particularly pointed out in the claims, and shown in the accompanying drawings, in which—

Figure 1 is a fragmentary end view, partly in section, showing one of my cams in position. Fig. 2 is an enlarged view of my cam in elevation, the cam-shaft being in section. Fig. 3 is a similar view with the intermediate portion of the cam shown in section. Fig. 4 is a section on the line 4 4 of Fig. 2, the shaft being shown in elevation. Fig. 5 is a detail perspective view of the meeting end portions of the two wings of the cam. Fig. 6 is a detail perspective view of the ring fitting over the meeting ends of the cam-wings. Fig. 7 is a detail perspective view of the ring, the two halves of the ring being shown separated. Fig. 8 is a detail view in elevation of the cam-shaft, showing the groove for the ball. Fig. 9 is a transverse section through the shaft.

In the figures, A and A' represent, respectively, the wings of a cam. The inner meeting ends of these wings are increased in width, the sides curving outwardly, and are reduced in thickness, as shown at B, whereby shoulders B' are formed, the said shoulders being curved on the arc of a circle the center of which corresponds with the axial line of the shaft when the wings are in position, as is clearly shown in Figs. 2 and 3. On each wing the shoulder B' extends around only a portion of the reduced part B of the wing, each reduced portion B having a marginal portion not environed by a shoulder, and this free marginal portion is upon the right-hand side of the wing A, as seen in Fig. 5, and upon the left-hand side of the wing A'. The reduced portion B of each wing is cut out, as shown at C, to fit the shaft D, and on the wing A' the wall of the cut-out portion C is recessed at C' for a purpose which will appear hereinafter. On each side of the cut-out portion C the reduced portion B of each wing is further reduced in thickness, as shown at $B^2$, this reduction being accomplished by cutting away the extreme end portions on the wing A on their inner face and similarly cutting away the outer face of the extreme end portions of the wing A', whereby the said end portions overlap when the wings are fitted upon the shaft D. These extreme end-overlapping portions are perforated, and the sections are also perforated in the reduced portions B, the perforations formed in the wing A alining with those of the wing A'. To fit over the portions B when the cam is in place on the shaft D, I provide a ring E, which ring is cut and the ends reduced on opposite sides, as shown at E', whereby the ends of the two halves overlap, these end portions being also perforated. The ring E when placed in position overlies the portions B of the cam-wings A and A', the periphery of the ring bearing on the shoulders B', and the outer face of the ring E lies flush with the sides of the cam-wings A and A'. The ring E is also adapted to fit the cam-shaft D, and when properly placed in position the perforations in the ring aline with those in the cam-wings, the perforations in the overlapping end portions alining with the perforations in the reduced portions B and the perforations $E^2$, formed in the ring midway the said end portions, alining with the perforations in the extreme ends of the wings of the cam, whereby the solid portion of the ring lies over the joint in the cam. Upon the other face of the cam I arrange two rings or washers, each of which is constructed similar to the ring E and which I designate F and F', the washer F being arranged in relation to the cam-wings similar to the ring E, and the ring F' is arranged so that its ends, the ring being cut as is the ring E, are at right angles to the ends of the cut rings E and F. Bolts G pass through all the rings and through each wing of the cam, binding them together, the heads of the bolts being countersunk in the cut-out face of the ring E and the nuts working upon the end portions of the bolts being sunk in the outer face of the ring F'.

The shaft D is provided with a seat or recess D', adapted to register with the recess C', formed in the wing A'. A ball H is arranged in the space formed by the recesses D' and C', and it will be obvious that this space is completely inclosed, the ring E forming one side of the chamber in which the ball is seated, the ring F the opposite side, the wing A' the top, and the shaft the bottom. By means of the ball H the cam is keyed to the shaft and permitted a slightly independent movement in rotation, but held against any movement longitudinally upon the shaft.

From the above description and the drawings it will be obvious that the cam can be readily removed from the shaft D should one of the wings be damaged or wear away and a new wing placed in position without disturbing the shaft in its bearings.

Having thus fully described my invention, what I claim as new, and desire to secure by Letters Patent, is—

1. A cam having separate wing portions the inner meeting ends of said wings being cut out to fit a shaft and reduced in thickness to overlap, oppositely-arranged shoulders on said wings, said shoulders being curved on an arc struck from the axial line of the shaft, and a sectional ring adapted to lie between the said shoulders and over the overlapping meeting ends of the wings, as and for the purpose set forth.

2. A cam formed in two wing-sections cut away to fit a shaft and reduced in thickness, and a sectional ring having overlapping end portions, the said ring being adapted to lie in the reduced portions of the wing-sections, the outer face of the ring being flush with the outer face of the cam-wings, and the solid portions of the ring overlying the juncture of the inner ends of the wings.

3. A cam formed of two wings, each wing having formed at its inner end a semicircular portion of less thickness than the wing proper, said reduced portion being cut away to fit a shaft and being partially inclosed by a shoulder, the extreme end portions of each wing being cut away on opposite faces and adapted to overlap, said overlapping portions having alining perforations formed therein, and the reduced portions of the wings having perforations intermediate the overlapping portions, and a cut ring having overlapping, perforated end portions and having perforations formed therein intermediate the end portions, the said ring being adapted to fit over the reduced portions of the wings the periphery of the ring bearing on the shoulders inclosing the reduced portions of the wing, the perforations in the overlapping end portions of the ring being adapted to aline with the perforations formed in the reduced portions of the wings intermediate their overlapping portions, and the perforations in the intermediate portions of the ring being adapted to aline with the perforations formed in the overlapping end portions of the wings, the outer face of the ring being flush with the outer face of the cam-wings proper.

JAMES J. HERVEY.

Witnesses:
 AUSTIN YOUNG,
 R. E. MACDONALD.